United States Patent
Yavin et al.

(10) Patent No.: US 8,928,750 B2
(45) Date of Patent: Jan. 6, 2015

(54) METHOD FOR REDUCING THE NUMBER OF SCANNING STEPS IN AN AIRBORNE RECONNAISSANCE SYSTEM, AND A RECONNAISSANCE SYSTEM OPERATING ACCORDING TO SAID METHOD

(75) Inventors: Zvi Yavin, Gilon (IL); Gabriel Katlan, Kiryat Motzkin (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 1985 days.

(21) Appl. No.: 11/994,086

(22) PCT Filed: Jun. 26, 2006

(86) PCT No.: PCT/IL2006/000744
§ 371 (c)(1),
(2), (4) Date: Sep. 15, 2008

(87) PCT Pub. No.: WO2007/004212
PCT Pub. Date: Jan. 11, 2007

(65) Prior Publication Data
US 2009/0009602 A1 Jan. 8, 2009

(30) Foreign Application Priority Data
Jun. 30, 2005 (IL) .......................................... 169482

(51) Int. Cl.
*H04N 7/18* (2006.01)
*G01C 11/02* (2006.01)

(52) U.S. Cl.
CPC .................................... *G01C 11/025* (2013.01)
USPC ............................ 348/143; 348/144; 348/145

(58) Field of Classification Search
None
See application file for complete search history.

(56) References Cited

U.S. PATENT DOCUMENTS 3,211,046 A   10/1965   Kennedy
5,155,597 A   10/1992   Lareau et al.
(Continued)

FOREIGN PATENT DOCUMENTS

WO   WO 97/42659       11/1997
WO   WO 03/102505      12/2003
WO   WO 2006/018835    2/2006

OTHER PUBLICATIONS

PCT International Preliminary Report on Patentability and Written Opinion of the International Searching Authority mailed Jan. 9, 2008, 7 pages.

(Continued)

*Primary Examiner* — Thomas Dailey
*Assistant Examiner* — Nam Tran
(74) *Attorney, Agent, or Firm* — Hunton & Williams, LLP

(57) ABSTRACT

An airborne reconnaissance system which comprises: (a) A focal plane array positioned at a focal plane of an optical unit, said focal plane array having an area A, and comprises a plurality of optical pixels sensitive to light; (b) Optical unit for acquiring light rays from a terrain portion, said optical unit comprises a plurality of optical components that are positioned along an optical path, and designed to maneuver said light rays to produce at the focal plane an image of said terrain portion, said image having an area which is several times larger than the focal plane array area A; (c) At least one light diversion optical component along said optical path which, for each acquired terrain portion image, switches between several n states, thereby causing in each state different diversion of said light rays within said path, thereby to impinge in each state another fraction of the terrain image on said focal plane array; and (d) Capturing means for recording in each state of the at least one light diversion optical component the portion of the terrain image which is impinged on the focal plane array.

9 Claims, 5 Drawing Sheets

(56) References Cited

U.S. PATENT DOCUMENTS

| | | | |
|---|---|---|---|
| 5,276,321 A | | 1/1994 | Chang et al. |
| 5,589,901 A | * | 12/1996 | Means .......................... 348/144 |
| 5,668,593 A | | 9/1997 | Lareau et al. |
| 5,692,062 A | | 11/1997 | Lareau et al. |
| 6,130,705 A | | 10/2000 | Lareau et al. |
| 6,256,057 B1 | | 7/2001 | Mathews et al. |
| 6,477,326 B1 | | 11/2002 | Partynski et al. |
| 6,658,207 B1 | * | 12/2003 | Partynski et al. ............. 348/144 |
| 2006/0245046 A1 | * | 11/2006 | Bergeron et al. ............. 359/366 |

OTHER PUBLICATIONS

International Search Report for PCT/IL2006/000744 mailed Dec. 12, 2007, 1 page.

\* cited by examiner

METHOD FOR REDUCING THE NUMBER OF SCANNING STEPS IN AN AIRBORNE RECONNAISSANCE SYSTEM, AND A RECONNAISSANCE SYSTEM OPERATING ACCORDING TO SAID METHOD

FIELD OF THE INVENTION

The present invention generally relates to a system for carrying out airborne reconnaissance. More particularly, the present invention discloses a reconnaissance system and method for reducing the number of scanning steps that are required for imaging a given area.

BACKGROUND OF THE INVENTION

Airborne reconnaissance systems have been widely used for many years now, particularly for obtaining images from the air of areas of interest.

Originally, a film camera was used on board of the aircraft for capturing images of the terrain. The main problem of an airborne, film-camera based reconnaissance system is the length of time required for developing the film, an operation that can be performed only after landing. This problem has been overcome in more modern systems by the use of a one-dimensional vector or a two-dimensional array of light-sensitive sensors (generally such an array is called a "focal plane array" hereinafter also referred to as FPA) in the camera for obtaining electronic images that are then electronically stored within the aircraft, and/or transmitted to a ground base station. This is generally done in such systems by scanning of the area of interest by the light-sensitive sensors in the direction of the flight.

Airborne reconnaissance systems are generally used to obtain images of hostile areas, and therefore the task of obtaining such images involves some particular requirements, such as:
1. Flying the aircraft at high elevations and speeds in order to reduce the risk of being targeted by enemy weapons, and in order to widen the area captured by each image;
2. When carrying out reconnaissance in low height and/or high speed (i.e., a high V/H ratio), trying not to compromise the image quality.
3. Trying to capture as much relevant image information as possible during as short as possible flight;
4. Trying to operate under various visibility conditions, while not compromising the resolution of the images and their quality.
5. Trying to photograph rough terrains (e.g., high mountains, areas having sharp ground variations), in high resolution and image quality.

The need for securing the reconnaissance aircraft, while flying above or close to hostile areas has significantly increased flying costs and risks, as sometimes the reconnaissance mission requires escorting of the aircraft by other, fighter aircrafts. Therefore, the need for enabling as short and reliable mission is of a very high importance.

There are several other problems that are generally involved in carrying out airborne reconnaissance. For example, capturing images from a fast-moving aircraft introduces the need for the so-called Forward Motion Compensation (Hereinafter, the term "Forward Motion Compensation" will be shortly referred to as FMC), to compensate for aircraft movement during the opening of the camera shutter (whether mechanical or electronic; in the latter case, the opening of the camera shutter for the purpose of exposure is equivalent to the integration of light photons by the light-sensitive components).

When light-sensitive sensors are used in the camera, three major scanning types are used:
i. The Along-Track Scanning (also known as "push-broom scanning")—In a first configuration of the Along-Track Scanning, the light-sensitive sensors are arranged in a one-dimensional vector (row), perpendicular to the flight direction. The scanning of the imaged area is obtained by the progression of the aircraft. In one specific configuration of Along-Track Scanning, generally called Along-Track TDI (Time Delayed Integration) configuration, a plurality of such parallel one-dimensional vectors (pixel-rows) perpendicular to the flight direction are provided at the front of the camera forming a two-dimensional array. In that case, however, the first row of the array captures an area section, while all the subsequent rows are used to capture the same section, but at a delay dominated by the aircraft progression. Then, for each row of pixels, a plurality of corresponding pixels of all the rows in the array, as separately measured, are first added, and then averaged in order to determine the pixel measured light intensity value. More particularly, each pixel in the image is measured N times (N being the number of rows) and then averaged. This Along-Track TDI configuration is found to improve the signal-to-noise ratio, and to improve the image quality and the reliability of measuring.
ii. The Across-Track Scanning (also known as "Whiskbroom Scanning")—In the Across-Track Scanning, a one-dimensional sensing vector of light-sensitive sensors, arranged parallel to the flight direction, is used. The sensing vector is positioned on gimbals having one degree of freedom, which, during the flight, repeatedly moves the whole vector right and left in a direction perpendicular to the direction of flight, while always keeping the vector in an orientation parallel to the direction of flight. Another Across-Track Scanning configuration uses a moving mirror or prism to sweep the line of sight (hereinafter, LOS) of a fixed vector of sensors across-track, instead of moving the vector itself. In such a case, the Across-Track Scanning of the area by the gimbals having one degree of freedom, while maintaining the forward movement of the aircraft, widens the captured area. Another configuration of the Across-Track Scanning is the Across-Track TDI configuration. In this configuration there exists a plurality of vectors (columns) in a direction parallel to the flight direction, forming a two-dimensional array. This Across-Track TDI, in similarity to the Along-Track Scanning TDI, provides an improved reliability in the measuring of pixel values, more particularly, an improvement in the signal-to-noise ratio.
iii. Digital Framing Scanning: In Digital Framing Scanning, a two-dimensional array of light-sensitive sensors is positioned with respect to the scenery. In U.S. Pat. No. 5,155,597 and U.S. Pat. No. 6,256,057 the array is positioned such that its column-vectors (a column being a group of the array's columns) are parallel to the flight direction. Forward motion compensation (FMC) is provided electronically on-chip (in the detector focal plane array) by the transferring of charge from a pixel to the next adjacent pixel in the direction of flight during the sensor's exposure time (also called "integration time"). The charge transfer rate is determined separately for each column (or for the whole array as in U.S. Pat. No. 6,256,057 where a slit is moved in parallel to the columns direction), depending on its individual distance (range) from the captured scenery, assuming flat ground. In WO 97/42659 this concept is extended to handle transferring of charge separately for each cell instead of column, a cell being a rectangular group of pixels. In the system of U.S. Pat. No. 5,692,062, digital image correlation between successive frames captured by each column is performed, in order to measure the velocity of the scenery with respect to the array, and the correlation result is used for estimating the average range of each column to the scenery, for the purpose of motion compensation in terrain with large variations. This compensation method requires capturing of three successive frames for each single image, two for the correlation process and one for the final motion-compensated frame. The system of U.S. Pat. No. 5,668,593 uses a 3-axis sightline stepping mechanism for expanding coverage of the area of interest, and it applies a motion compensation technique by means of transferring of charge along columns. U.S. Pat. No. 6,130,705 uses a zoom lens that automatically varies the camera field of view based on passive range measurements obtained from digital image correlation as described above. The field of view is tuned in accordance with prior mission requirements for coverage and resolution.

A significant problem which is characteristic to all the above types of prior art reconnaissance systems is the limited field of view of the camera. Generally, the prior art systems comprise a lens at the front of the imaging system, and additional optics which impinge the terrain image onto a focal plane array. The lens generally has a limited field of view, in the range about 30°. Increase of the lens field of view results in an image of a larger area portion, but also in reduction in the resolution of the captured image. Therefore, when there is a need to obtain high resolution images in a wide field of regard by the prior art systems having a limited field of view, in most of such systems the optics and the focal plane array are mounted on gimbals, which repeatedly change the camera line of sight direction towards the terrain. The line of sight is changed in a direction perpendicular to the flight, i.e., from the right to the left of the aircraft and vice versa. During each such change of the line of sight transversal to the flight direction, hereinafter also referred to as a "a scanning step", one terrain image from a transversal terrain strip is acquired. Performing the scanning steps in a fast and accurate manner requires having a complicated gimbals system and servo mechanism. The more such steps are included in a single full strip scanning (a full strip scanning is defined as the scanning by which a full transversal terrain strip is obtained), results in more images, each image referring to a smaller terrain area, but with higher resolution.

Generally, the terrain area which is acquired by each image capturing is also a function of the focal plane array resolution. When the focal plane array includes more pixels, a larger area portion can be acquired for a given resolution. When the number of the pixels in the focal plane array is small, image of a smaller terrain area is acquired, and more scanning steps are required in order to cover a given area at a given resolution. However, more scanning steps involve more stress on the gimbals system, or alternatively, enforces slower scanning. There are many cases in which the optics in front of the FPA can enable obtaining a larger area with a satisfactory manner, but the small focal plane array (i.e., having fewer pixels) enforces a smaller terrain area image and more scanning steps.

It is therefore an object of the present invention to reduce the number of scanning steps required for scanning a given terrain area in a desired resolution.

It is another object of the present invention to enable scanning a larger area in a given time and resolution, but with a smaller focal plane array.

It is still another object of the invention to reduce stress and accuracy requirements from the gimbals system on which the optics and focal plane array are mounted.

Other objects and advantages of the present invention will become apparent as the description proceeds.

SUMMARY OF THE INVENTION

The present invention relates to an airborne reconnaissance system which comprises: (a) a focal plane array positioned at a focal plane of an optical unit, said focal plane array having an area A, and comprises a plurality of optical pixels sensitive to light; (b) optical unit for acquiring light rays from a terrain portion, said optical unit comprises a plurality of optical components that are positioned along an optical path, and designed to maneuver said light rays to produce at the focal plane an image of said terrain portion having an area which is several times larger than the focal plane array area A; (c) At least one light diversion optical component along said optical path which, for each acquired terrain portion image switches between several 71 states, thereby causing in each state different diversion of said light rays within said path, thereby to impinge in each state another fraction of the terrain image on said focal plane array; and (d) Capturing means for recording in each state of the at least one light diversion optical component the portion of the terrain image which is impinged on the focal plane array.

Preferably, the system further comprises gimbals mechanism on which said system is mounted, for changing a line of sight direction between the system and the terrain, thereby to acquire another terrain portion each time said change of direction is made.

Preferably, said at least one light diversion component is one folding mirror.

Preferably, said folding mirror diverts the light by rotating independently about two perpendicular axes.

Preferably, said at least one light diversion component are two folding mirrors.

Preferably, each of said two folding mirrors diverts the light by rotating about one axis.

Preferably said one axis is perpendicular to the line of sight direction entering that specific mirror.

Preferably, the optical unit comprises a plurality of lenses and at least one folding mirror.

The present invention also relates to a method for reducing the number of scanning steps when imaging a terrain by an airborne reconnaissance system, which comprises the steps of: (a) directing an optical unit of said system toward a selected portion of the terrain, and acquiring light there from; (b) maneuvering said light rays along an optical path within said optical unit, and producing at a focal plane an image of said terrain portion which is several times larger than the area of a focal plane array that is located at same focal plane; (c) defining several imaging states, wherein in each imaging state diverting the maneuvered light rays differently within the optical unit in such a manner as to impinge in each state a different fraction of said terrain portion image which is produced at said focal plane array; (d) in each state, capturing and recording the image portion which is impinged on the focal plane array at that state; (e) when all fractions of the image of the selected terrain portion are captured, selecting a next terrain portion; and (f) repeating the procedure from step a, while selecting a next terrain portion.

DETAILED DESCRIPTION OF PREFERRED EMBODIMENTS

Figure 1:
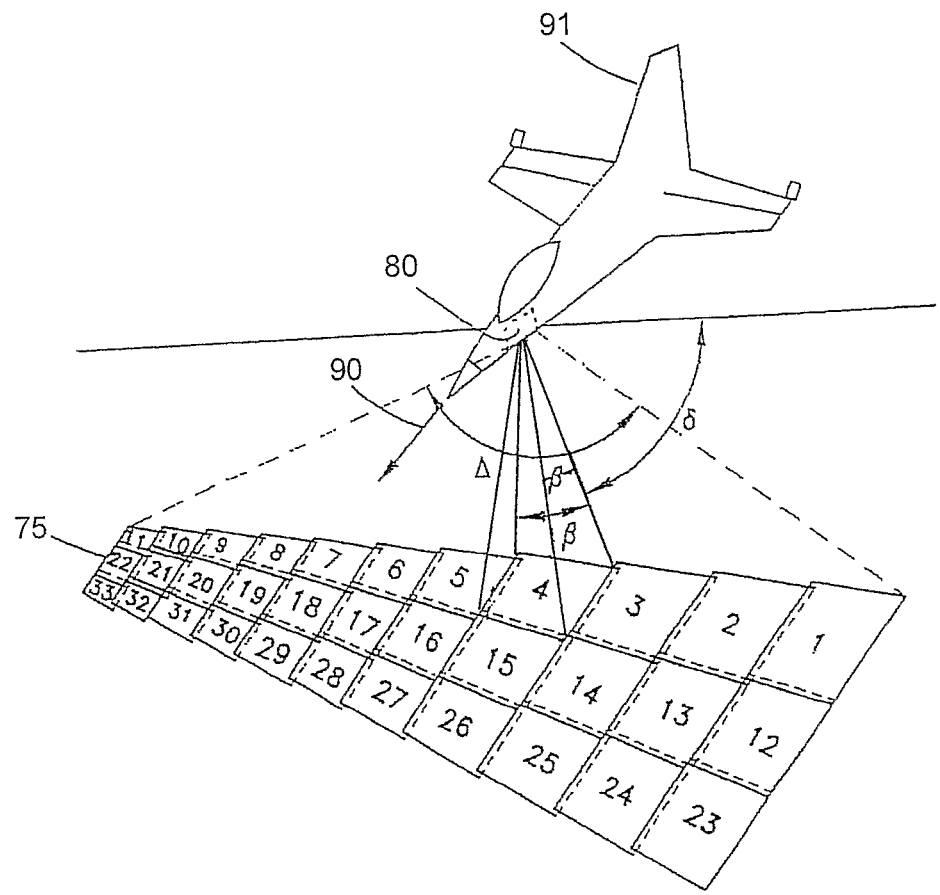
FIG. 1 shows a prior art airborne reconnaissance system according to the prior art.

FIG. 1 shows a prior art airborne reconnaissance system according to the prior art. Aircraft 91 flying in the direction 90 is provided with an imaging system 80 (hereinafter also referred to as "camera"). The imaging system is provided with optics having a front lens (not shown), for acquiring a full image of terrain 75. The imaging system generally forms a full image of terrain 75 by means performing a plurality of scanning steps. During each scanning step, the imaging system 80 having an opening (field of view) β acquires one image. Performing a transversal scanning operation during which the line of sight angle δ of the camera is changed, a plurality of images 1-11, all being along one transversal strip are acquired. Capturing a full strip, requires in this case the changing the camera field of view direction by angle Δ, during which 11 scanning steps are performed and 11 images are acquired, impinged on a focal plane array within the imaging system, and captured. The scanning operation is then repeated by acquiring images 12-22 belonging to a second strip, 23-33 belonging to a third strip, etc.

There are some cases in which the optics of the imaging system 80 can provide a satisfactory image resolution even if doubling the field of view size—angle β—thereby acquiring a 4 times larger terrain area portion. However, the small size of the focal plane array used (i.e., the number of pixels in it) dictates capturing of smaller area portions and more scanning steps in order to cover a given area. As said, an increase of the number of scanning steps causes an increased stress on the gimbals system, and it slower the total rate of the terrain area imaging.

Figure 2:
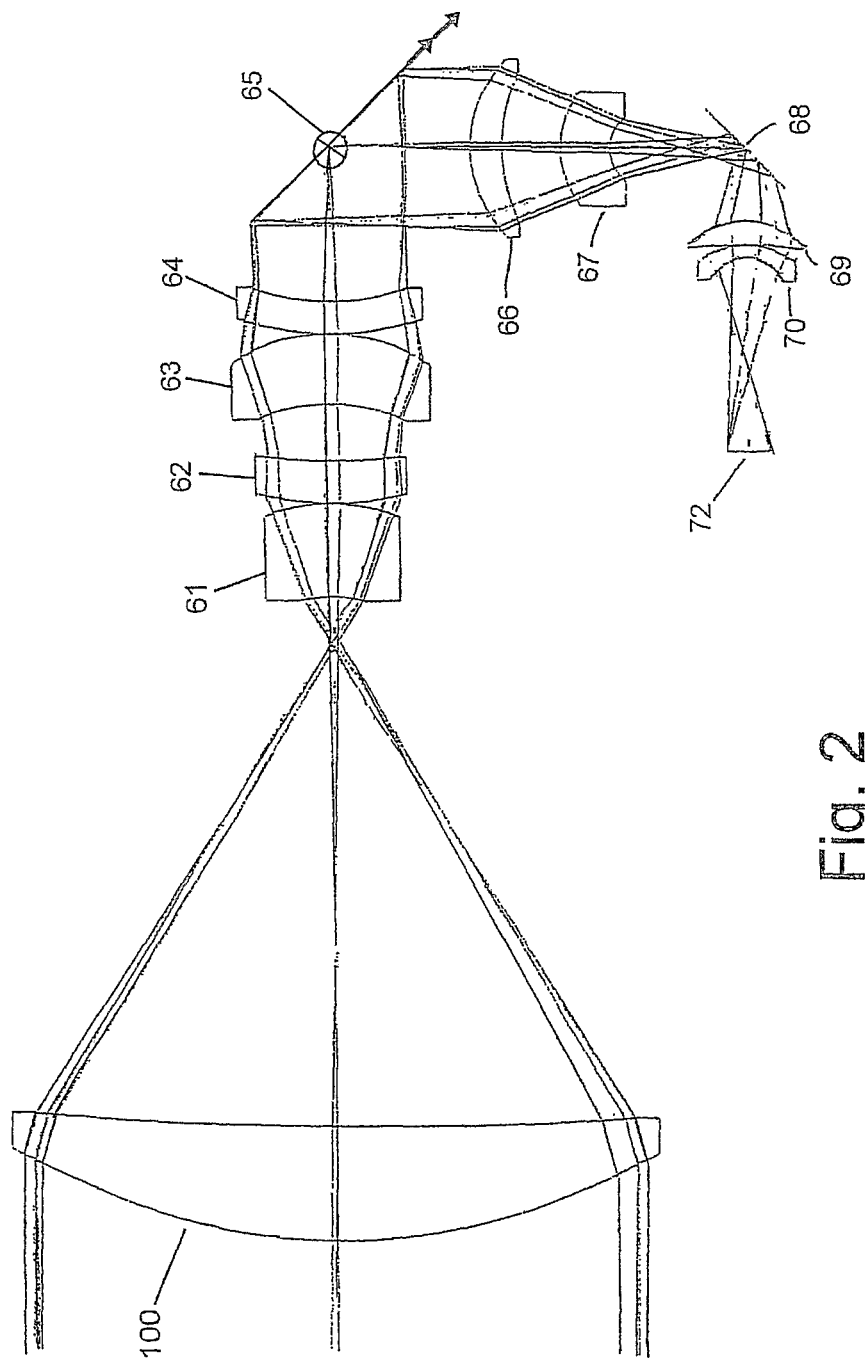
FIG. 2 shows a typical imaging system according to the prior art.

FIG. 2 shows a typical imaging system according to the prior art. The system is positioned on gimbals (not shown), which changes the line of sight direction to the terrain, and enables obtaining a plurality of images within a transversal strip in a manner as described in FIG. 1. In one state of the gimbals, the front lens 100 of the system is directed toward a terrain image portion (such as image 4 of FIG. 1) and collects light rays therefrom. The light rays pass an optical path, which comprises a series of optical elements indicated in FIG. 2 as elements 61-70. Such elements are generally lenses such as lenses 61, 62, 63, 64, 66, 67, 69, and 70, and one or more folding mirrors 65 and 68. Other conventional optical elements may also included. At the final stage, the system produces a final image of the terrain portion (for example, portion 4 of FIG. 1) on a focal plane array 72. The size of said final image is dictated by the optics, and it is so designed in the prior art to be essentially of the size of the focal plane array 72, as otherwise some of the terrain data will be lost (for not being captured by the focal plane array). It should be noted that in the prior art system the folding mirrors 65 and 68 are fixed (i.e., stationary).

Figure 3:
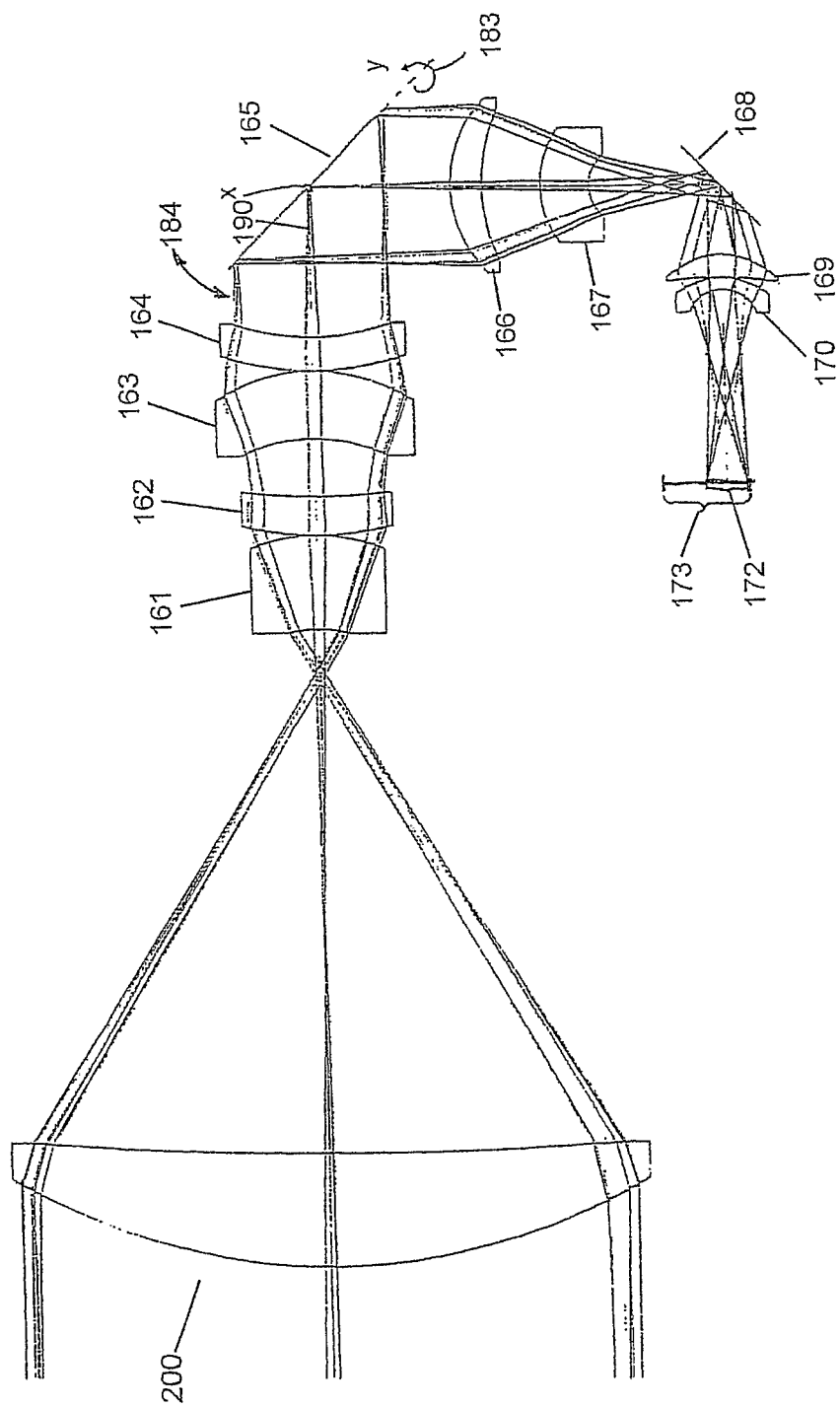
FIG. 3 shows an optical system according to an embodiment of the present invention.
Figure 4:
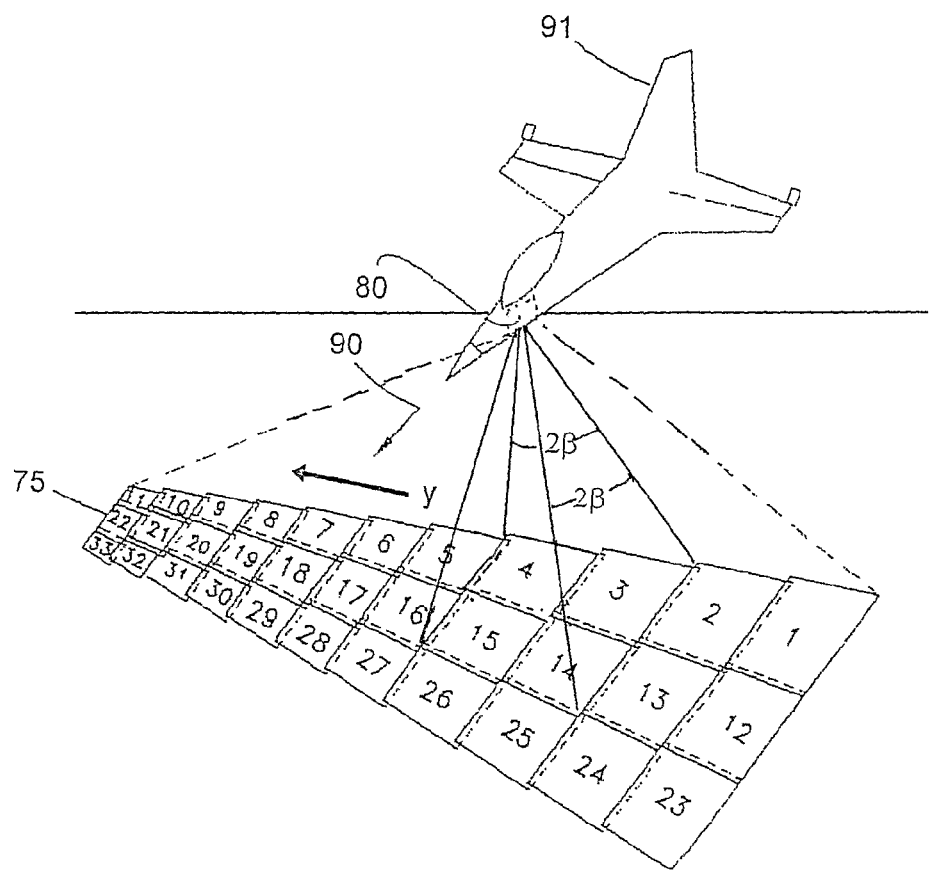
FIG. 4 provides an example for the acquiring of an image according to one embodiment of the invention.

An optical system according to the present invention is shown in FIG. 3. The system of FIG. 3 is similar to the prior art system FIG. 2, with those elements of FIG. 3 having similar indexes to corresponding elements of FIG. 2 (with the addition of "100" in FIG. 3 to the index of said elements of FIG. 2) and the elements in FIG. 3 performing a similar functionality to those of FIG. 2. However the system according to the present invention acquires a terrain portion with is several times larger in size than the terrain portion acquired by the system of FIG. 2.

According to the present invention, however, the portion of the image 173 that is impinged on the focal plane array is switched. This is done by changing the orientation of one of the folding mirrors, preferably mirror 165 between several states. If the size of the image produced at the focal plane is 4 times the size of the focal plane array, the mirror has 4 states. If the size is 9 times the size of the focal plane array, there are 9 states. Said mirror has small rotation about two perpendicular axes, axis x and axis y, as indicated by arrows 183 and 184, between several states. For example, for double size β, the rotation of mirror 165 about axis x may switch the mirror between 2 states, and the rotation about axis y may switch the mirror between two additional states, a total of four states. The rotation is generally very small, and at the end of the rotation the mirror is fixed. The states of the mirror are so designed that at each state the light rays are so diverted that another portion of image 173 is fully impinged on the focal plane array 172.

Therefore, according to the present invention the image size which is produced at the focal plane is several times larger than the size of the focal plane array. In one example, when angle β is doubled, the area of the image is four ($2^2$) times the area of the focal plane array. In such a case the folding mirror has four states. In another example, angle β is three times larger, and the area of the image is 9 ($3^3$) times larger than the area of the focal plane array. In such latter case, the folding mirror has 9 states. As said, in each mirror state another portion of the image is impinged on the focal plane array, which in itself is fixed as in the prior art.

In a typical case, it has been found that the orientation of the relevant folding mirror has to be changed by about only 2° in order to switch between two image portions. This change of orientation can be performed, of course, in a much faster manner than it takes to switch between two scanning steps. Therefore, the scanning rate can significantly be increased by the system of the present invention, without increasing the number of scanning steps.

EXAMPLE

One case in which the present invention is particularly useful is the case of a double mode imaging system, in which a same imaging system is used for capturing images in two different spectrums, for example in the visual range, and in the IR range. Generally, IR focal plane arrays are smaller in size (i.e., having fewer pixels) than visual FPAs. One reason for this is the need for providing cooling to IR FPAs, which is not necessary in visual FPAs. Therefore, it is a common situation in which an IR FPA having a resolution of 512×512 pixels is used, together with a visual FPA having 2K×2K pixels. It is also generally desired to have a same resolution of the captured images in said two spectrums. Therefore, in the prior art, and with the said IR and visual FPAs, when the image produced at the focal plane has the size of the corresponding FPA, there may be two situations as follows:

a. When operating in the IR mode, acquiring in each scanning step an area terrain portion of much smaller size in comparison with the terrain portion acquired in the visual mode, in order to accommodate the IR image acquired within the much smaller size of FPA. This, however, requires performance of 16 times more scanning steps, which results in a much slower scanning rate.

b. Alternatively, it is possible to produce at the focal plane an image of the size of the IR focal plane array, however, that image representing a much larger terrain area (terrain area 16 times larger in comparison to the visual case). This is of course results in a resolution 16 times worse than in the visual case.

In the system of the present invention, on the other hand, the following situation occurs:

c. In the IR mode, in each step an image of a same terrain area as in the visual case is acquired by the optical system. However, at the focal plane an image which is 16 times larger than the IR focal plane array is produced. The orientation of the relevant folding mirror is changed between 16 states during each scanning step, therefore impinging in each time a different portion of the image on the IR focal plane array. The resolution of each portion as obtained from the IR FPA is the same as in the visual case. Therefore, the system of the present invention enables obtaining an IR image of the terrain with a smaller size FPA, by applying many fewer scanning steps by the gimbals system, and while not sacrificing the resolution of the obtained image.

Figure 5A:
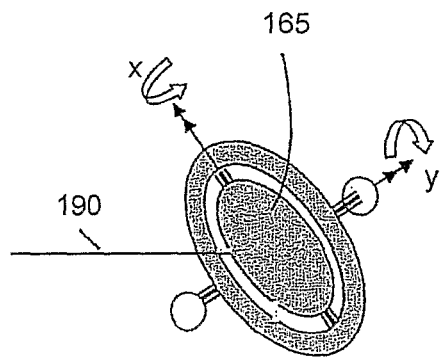
FIG. 5A illustrates the operation of the apparatus of the present invention by means of one mirror having two degrees of freedom.
Figure 5B:
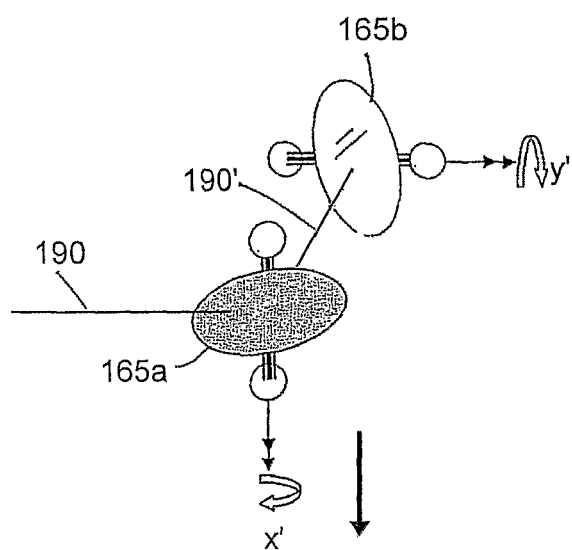
FIG. 5B illustrates the operation of the apparatus of the present invention by means of two mirrors each having one degree of freedom.

In the structure of the system as shown in FIG. 3, there is one dynamic mirror 165 that switches between several orientations (for example, 4, 9, or 16 orientations). The mirror is located at a focal point (where the light rays are converged). Moreover, the mirror 165 is rotated about two perpendicular axes x and y, in order to obtain said several states. FIG. 6A shows the mirror 165, and the two axes x, and y. The light rays coming from the terrain through the optics are indicated by numeral 190. It has been found by the inventors that using one mirror 165 that rotates about two axes (x and y) has some disadvantages. First, the mechanism for applying to one mirror two degrees of freedom is quite complicated. Moreover, it can be seen that while axis x is perpendicular to the line of sight, axis y is not perpendicular with respect to the line of sight (the light rays entering the mirror). It has been observed that the rotation of the mirror about an axis y which is not perpendicular to the line of sight causes distortion of the image at the image plane, while the rotation about axis x (perpendicular to the line of sight) does not cause such a distortion. Therefore, according to a more preferred embodiment of the invention, and as shown in FIG. 5B, the mirror 165 has been replaced by two separate mirrors, mirror 165a and mirror 165b being about 45° one with respect to the other. Mirror 165 therefore rotates only about axis x' which is perpendicular to the line of sight 190, and mirror 165b rotates about axis y' which is also perpendicular to continuation of the line f sight 190'. In such a manner the said distortion of the image is avoided, and furthermore, the mirrors system becomes much less complicated, as each the two mirrors rotates about only one axis.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An airborne reconnaissance system in which the number of scanning steps for imaging the terrain is reduced, which comprises:
   a. a focal plane array positioned at a focal plane of an optical unit, said focal plane array having an area A, and wherein said focal plane array comprises a plurality of optical pixels sensitive to light;
   b. an optical unit for acquiring light rays from a terrain portion, wherein said optical unit comprises a plurality of optical components that are positioned along an optical path, and are designed to maneuver said light rays to produce at the focal plane an image of said terrain portion, said image having an area which is several times larger than the focal plane array area A;
   c. at least one light diversion optical component along said optical path which, for each acquired terrain portion image, switches between several n states, thereby causing in each state different diversion of said light rays within said path, thereby to impinge in each state another fraction of the terrain image on said focal plane array wherein said impinged terrain fraction of a terrain portion is overlap free with respect to any other previous or subsequent impinged terrain fraction; and
   d. a recorder for recording in each state of the at least one light diversion optical component the corresponding fraction of the terrain portion which is impinged on the focal plane array.

2. The system according to claim 1, further comprising a gimbals mechanism on which said system is mounted, for changing a line of sight direction between the system and the terrain, thereby to acquire another terrain portion each time said change of direction is made.

3. The system according to claim 1 wherein said at least one light diversion component is one folding mirror.

4. The system according to claim 3 wherein said folding mirror diverts the light by rotating independently about two perpendicular axes.

5. The system according to claim 1 wherein said at least one light diversion component comprises two folding mirrors.

6. The system according to claim 5 wherein each of said two folding mirrors diverts the light by rotating about one axis.

7. The system according to claim 6 wherein said one axis is perpendicular to the line of sight direction entering that specific mirror.

8. The system according to claim 1 wherein the optical unit comprises a plurality of lenses and at least one folding mirror.

9. An airborne reconnaissance scanning method in which the number of scanning steps for imaging the terrain is reduced, comprising:
   a. directing an optical unit of a reconnaissance system toward a selected portion of the terrain, and acquiring light rays therefrom;
   b. maneuvering said light rays along an optical path within said optical unit, and producing at a focal plane an image of said terrain portion which is several times larger than the area of a focal plane array which is located at said focal plane;
   c. defining several imaging states, wherein in each imaging state the maneuvered light rays are diverted differently within the optical unit in such a manner as to impinge in each state a different fraction of said terrain portion image which is produced at said focal plane array, wherein said different impinged terrain fraction is overlap free with respect to any other previous or later impinged terrain fraction;
d. in each state, capturing and recording the image which is impinged on the focal plane array during said state;
e. when all fractions of the image of the selected terrain portion are captured, selecting a next terrain portion; and
f. repeating the procedure from step a, while selecting a next terrain portion.

* * * * *